(12) United States Patent
Kudaravalli et al.

(10) Patent No.: US 10,176,104 B2
(45) Date of Patent: Jan. 8, 2019

(54) INSTRUCTION PREDECODING

(71) Applicant: ARM LIMITED, Cambridge (GB)

(72) Inventors: Vasu Kudaravalli, Austin, TX (US); Matthew Paul Elwood, Austin, TX (US); Adam George, Austin, TX (US); Muhammad Umar Farooq, Austin, TX (US); Michael Filippo, Driftwood, TX (US)

(73) Assignee: ARM Limited, Cambridge (GB)

( * ) Notice: Subject to any disclaimer, the term of this patent is extended or adjusted under 35 U.S.C. 154(b) by 102 days.

(21) Appl. No.: 15/281,226

(22) Filed: Sep. 30, 2016

(65) Prior Publication Data

US 2018/0095752 A1   Apr. 5, 2018

(51) Int. Cl.
| | | |
|---|---|---|
| *G06F 9/40* | (2006.01) | |
| *G06F 9/45* | (2006.01) | |
| *G06F 12/02* | (2006.01) | |
| *G06F 12/0875* | (2016.01) | |
| *G06F 9/38* | (2018.01) | |
| G06F 9/30 | (2018.01) | |
| G06F 8/41 | (2018.01) | |

(52) U.S. Cl.
CPC .......... *G06F 12/0875* (2013.01); *G06F 9/382* (2013.01); *G06F 8/41* (2013.01); *G06F 9/3016* (2013.01); *G06F 9/3017* (2013.01); *G06F 9/30145* (2013.01); *G06F 9/30196* (2013.01); *G06F 9/3808* (2013.01); *G06F 9/3842* (2013.01); *G06F 9/3844* (2013.01); *G06F 9/3846* (2013.01); *G06F 9/3848* (2013.01); *G06F 2212/452* (2013.01)

(58) Field of Classification Search
CPC .... G06F 9/3016; G06F 9/3802; G06F 9/3804; G06F 9/3808; G06F 9/382; G06F 9/3017; G06F 9/30196; G06F 9/3895; G06F 9/30145; G06F 9/3842; G06F 9/3844; G06F 9/3846; G06F 9/3848; G06F 8/40; G06F 8/41; G06F 8/44; G06F 12/0875; G06F 2212/452; G06F 2212/453
USPC ........ 712/203, 213, 239, 240; 717/136–148; 711/125
See application file for complete search history.

(56) References Cited

U.S. PATENT DOCUMENTS 5,701,487 A * 12/1997 Arbouzov ............... G06F 8/423
714/38.1
5,881,265 A * 3/1999 McFarland ......... G06F 9/30003
712/218
(Continued)

*Primary Examiner* — Daniel H Pan
(74) *Attorney, Agent, or Firm* — Nixon & Vanderhye, P.C.

(57) ABSTRACT

An apparatus comprises processing circuitry, an instruction cache, decoding circuitry to decode program instructions fetched from the cache to generate macro-operations to be processed by the processing circuitry, and predecoding circuitry to perform a predecoding operation on a block of program instructions fetched from a data store to generate predecode information to be stored to the cache with the block of instructions. In one example the predecoding operation comprises generating information on how many macro-operations are to generated by the decoding circuitry for a group of one or more program instructions. In another example the predecoding operation comprises generating information indicating whether at least one of a given subset of program instructions within the prefetched block is a branch instruction.

18 Claims, 6 Drawing Sheets

(56) References Cited

U.S. PATENT DOCUMENTS

| | | | |
|---|---|---|---|
| 6,542,986 B1* | 4/2003 | White | G06F 9/30152 |
| | | | 712/217 |
| 6,886,093 B2* | 4/2005 | Henry | G06F 9/30149 |
| | | | 712/237 |
| 2003/0182535 A1* | 9/2003 | Kadowaki | G06F 9/3017 |
| | | | 712/207 |
| 2013/0132658 A1* | 5/2013 | Matsuse | G06F 12/0875 |
| | | | 711/104 |

* cited by examiner instruction                              macro-op
ADD R0, R1, R2, cond   ⟶   ADD R0, R1, R2, (R0), cond
ADD R0, R0, R1, cond   ⟶   ADD R0, (R0), R1, cond
FIG. 8
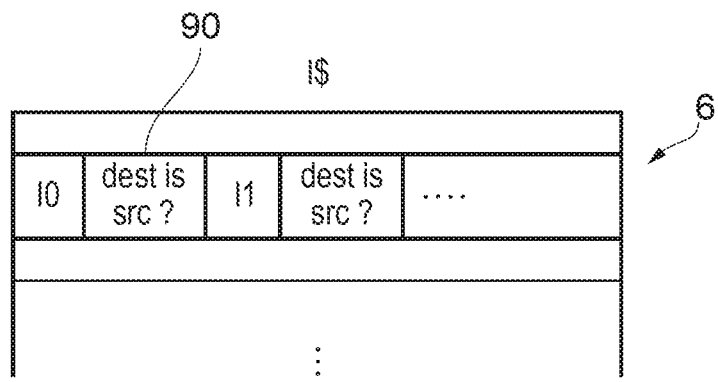
FIG. 9
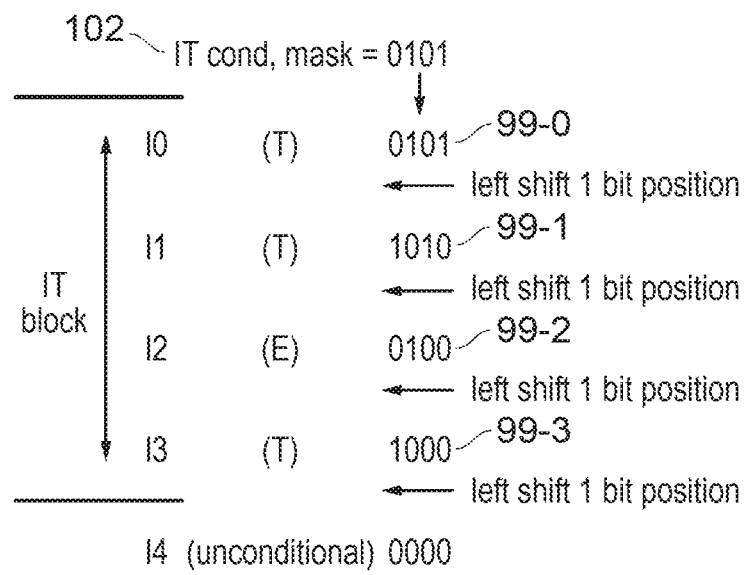
FIG. 10

INSTRUCTION PREDECODING

BACKGROUND

Technical Field

The present technique relates to the field of data processing.

Technical Background

A data processing apparatus may have decoding circuitry for decoding program instructions fetched from an instruction cache to generate the control signals required for controlling processing circuitry to process corresponding processing operations.

SUMMARY

At least some examples provide an apparatus comprising:
processing circuitry;
an instruction cache;
decoding circuitry to decode program instructions fetched from the instruction cache to generate macro-operations to be processed by the processing circuitry; and
predecoding circuitry to perform a predecoding operation on a block of program instructions fetched from a data store to generate predecode information to be stored to the instruction cache for said block of program instructions;
wherein the predecoding operation comprises generating predecode information indicative of how many macro-operations are to be generated by the decoding circuitry in response to a group of one or more program instructions within said block of program instructions fetched from the data store.

At least some examples provide a data processing method comprising:
fetching a block of program instructions from a data store;
performing a predecoding operation on the block of program instructions to generate predecode information;
storing the block of program instructions and the predecode information in an instruction cache; and
decoding program instructions fetched from the instruction cache to generate macro-operations to be processed by processing circuitry;
wherein the predecoding operation comprises generating predecode information indicative of how many macro-operations are to be generated by the decoding circuitry in response to a group of one or more program instructions within said block of program instructions fetched from the data store.

At least some examples provide an apparatus comprising:
an instruction cache;
decoding circuitry to decode program instructions fetched from the instruction cache;
processing circuitry to perform data processing in dependence on the decoded program instructions; and
predecoding circuitry to perform a predecoding operation on a block of program instructions prefetched from a data store to generate predecode information to be stored to the instruction cache for said block of program instructions;
wherein the predecoding operation comprises generating predecode information indicative of whether a subset of program instructions within said block of instructions comprises at least one branch instruction.

Further aspects, features and advantages of the present technique will be apparent from the following description of examples, which is to be read in conjunction with the accompanying drawings.

BRIEF DESCRIPTION OF THE DRAWINGS

FIG. 8 shows an example of an instruction where a previous value stored in the destination register may be specified as an operand for the corresponding macro-operation;

FIG. 9 shows an example of the instruction cache storing predecode information indicating whether a program instruction specifies a same register as both the source and destination register;

FIG. 10 illustrates an example of controlling conditional processing of an instruction based on a control field derived from a preceding instruction;

FIG. 1 schematically illustrates an example of a data processing apparatus 2 comprising a processing pipeline for processing program instructions to perform data processing operations. The program instructions are stored in a data store 4, which may be any storage unit within a memory system, such as main memory or level 2 cache for example. Instructions from the data store are prefetched into a level 1 instruction cache 6 which stores a subset of the instructions from the data store 4. A branch predictor 8 predicts the outcome of any branch instructions and uses the predicted outcomes to determine a series of fetch addresses representing the predicted flow of program execution. The fetch addresses are provided to a fetch stage 10 which fetches the corresponding instructions from the instruction cache 6 and passes the fetched instructions to a decode stage 12. The decode stage 12 decodes the fetched instructions to identify the type of operations to be performed and generates corresponding macro-operations which are passed to the remaining stages of the pipeline. Some program instructions may map to a single macro-operation, while other program instructions may be split into multiple macro-operations. Sometimes, the decode stage 12 may also fuse two or more separate program instructions provided by the fetch stage 10 into a single fused macro-operation to be provided to later stages. Hence, there may be a one-to-one, one-to-many or many-to-one mapping of program instructions to macro-operations (which of these options is used may vary depending on the type of the fetched instruction). The macro-operations represent the decoded operations to be performed by the remaining stages of the pipeline.

Figure 1:
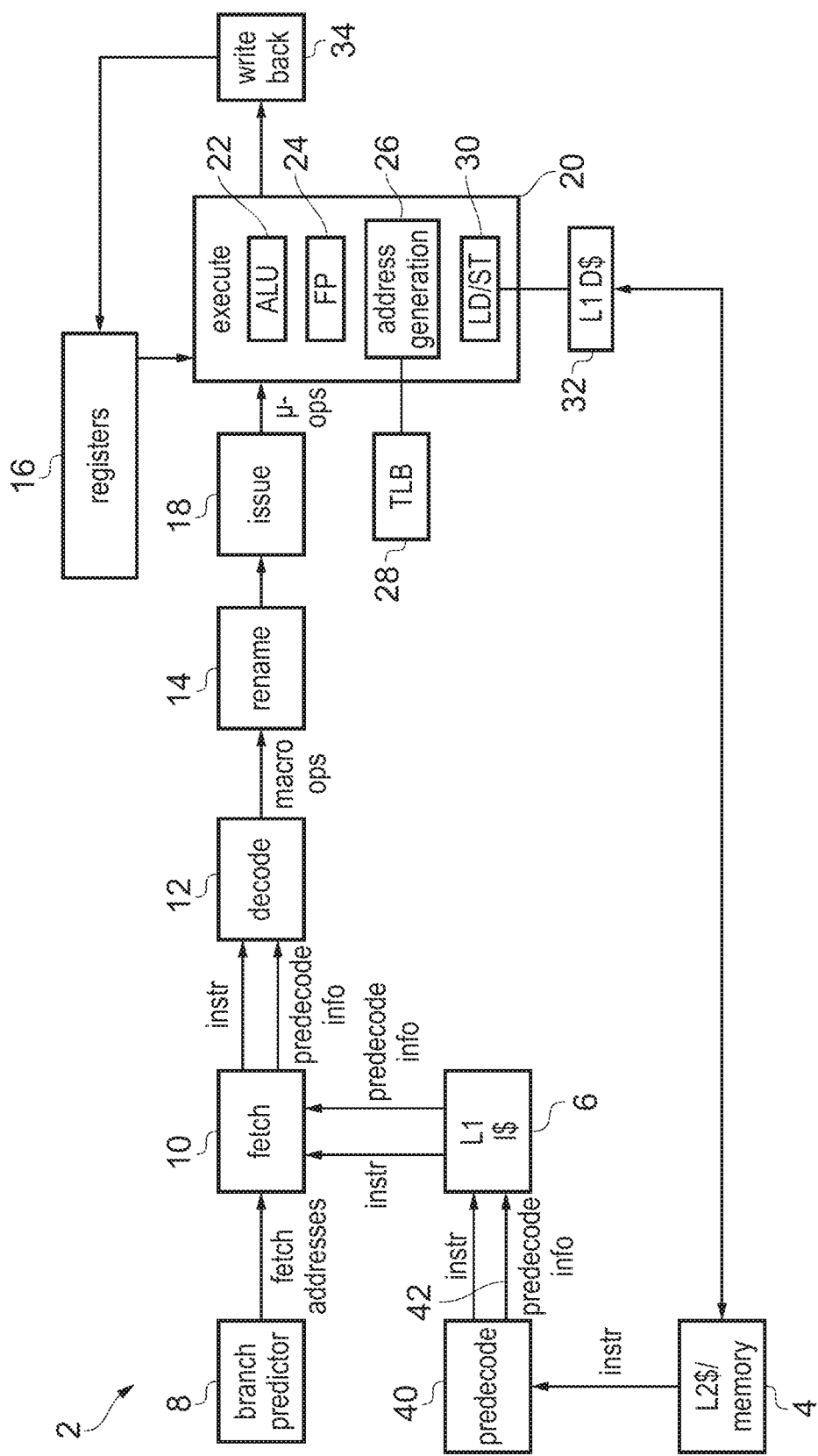
FIG. 1 schematically illustrates an example of a data processing apparatus having predecoding circuitry.

The macro-operations are provided to a register rename stage 14 for performing register renaming to map architectural registers specified by the macro-operations to physical registers 16 provided in hardware. Register renaming can be particularly useful for an out-of-order processor, because mapping the same architectural register in two different instructions onto different physical registers of the physical register file 16 can help to avoid hazards between instructions, and hence increase the extent to which the execution order of the series of instructions can be varied relative to the program order in which they were fetched. This can help improve performance by increasing the chance that a later instruction can execute while an earlier instruction is waiting for operands to become available.

The renamed macro-operations are provided to an issue stage 18 which queues the macro-operations while they wait for their source operands to become available. Once operands are available for a given macro-instruction or group of macro-instructions, one or more corresponding micro-operations are issued by the issue stage 18 to the execute stage 20. In some implementations, at the issue stage 18 there may be further splitting of macro-operations into smaller micro-operations to be handled by the execute stage 20. Similarly, there could also be a late fusion of multiple macro-operations into a single micro-operation handled by the pipeline. Fusing or splitting macro-operations at the issue stage 18 can be useful to allow the availability of operands in the registers 16 to be considered when determining whether it is best to process a given set of macro-operations in a fused or split form. Other macro-operations may simply be issued unchanged so that the micro-operation encountered by the execute stage 20 is identical to the corresponding macro-operation. Also, some implementations may not support this late splitting/fusion of micro-operations at all, and in this case the micro-operations handled by the execute stage 20 may be exactly the same as the macro-operations generated at the decode stage 12.

The execute stage 20 receives the issued micro-operations and has a number of execute units for carrying out processing operations for different classes of micro-operations. In FIG. 1, for example, the execute stage 20 has an arithmetic/logic unit (ALU) 22 for performing arithmetic or logical operations, a floating point unit 24 for performing operations involving floating-point operations, an address generation unit 26 for generating addresses for load/store operations and triggering translation of virtual addresses into physical addresses using a translation lookaside buffer 28, and a load/store unit 30 for performing load/store operations for transferring data between the register file 16 and the memory system. In addition to the level 1 instruction cache 6 and the level 2 cache or main memory 4, the memory system may also comprise a level 1 data cache 32. The execute stage 20 reads the required source operands from the physical register file 16 and generates corresponding processing results, which are written back to the register file by a write back stage 34.

It will be appreciated this is just one example of a possible pipeline of architecture and other examples may have different arrangements of pipeline stages. For example, in an in-order processor, the rename stage 40 may be omitted and in this case the physical registers accessed by the execute stage may be the same as the architectural registers specified by the instruction encodings. Also, in some cases the execute stage 20 may include other types of execute unit, and could for example include two or more versions of the same type of execute unit, e.g. several different ALU type execution units for executing different subsets of arithmetic or logical operations. Also, while FIG. 1 shows one example of a memory hierarchy comprising separate L1 instruction and data caches and a shared L2 cache/main memory, other examples could have a different configuration, e.g. further levels of cache or a dedicated L2 data cache.

As shown in FIG. 1, predecoding circuitry 40 is provided to perform a predecoding operation on a block of program instructions fetched from the data store 4 to generate predecode information 42 which is stored in the instruction cache 6 along with the block of program instructions themselves. While providing additional circuitry to examine instruction opcodes at the prefetch stage may seem redundant as the decode stage 12 is already provided, and the additional predecoding information 42 generated as sideband information to the instructions requires some additional storage capacity in the cache 6, in practice performing some decoding operations at the predecode stage 40 can provide overall performance improvements and increase power savings. A number of examples of such predecoding operations are discussed below.

In one example, the predecoding operation performed by the predecode circuitry 40 may comprise generating predecode information which is indicative of how many macro-operations are to be generated by the decode stage 12 in response to a group of one or more program instructions within the block of instructions being fetched from the data store 4. The predecode information can be stored as sideband information within the instruction cache and provided along with the instructions when the instructions are fetched to the decode stage 12. The decoding stage 12 can then determine how many macro-operations are to be generated in response to the group of one or more program instructions in dependence on the predecode information 42 which was generated by the predecoding circuitry 40.

This approach can have several benefits. Firstly, the amount of logic circuitry in the decoding stage 12 can be reduced since there are fewer decoding operations to be performed, which can help improve timing to improve performance. While the decode stage 12 is on the critical timing path, since it acts on instructions which actually need to be executed, the predecode stage 40 acts on instructions which are being prefetched into the instruction cache 6 sometime in advance of them actually being required by the processing pipeline. In some cases the prefetching may be done speculatively so it is not even certain whether the prefetched instructions will even be executed. Hence, as the predecode stage 40 is often off the critical path, performing some operations for identifying the number of macro-operations required at the predecode stage 40 rather than the decode stage 12 can help to improve performance.

Also, an instruction stored in the instruction cache 6 may be fetched several times during execution of a program. For example if the program includes a loop and program flow steps through multiple iterations of the loop, then the same set of instructions may be executed several times. By performing the macro-operation identifying operation at the predecode stage 40 rather than the decode stage 12, this operation only has to be done once when the instruction is loaded into the instruction cache 6, rather than multiple times each time the same instruction is fetched for execution. This enables power savings in the pipeline.

Hence, the predecode stage 40 can be used to identify how many macro-operations are to be generated by the decode stage 12 for a given group of one or more program instructions. This approach can be used both for the splitting case where one instruction is split into multiple macro-operations and the fusion case where several program instructions are fused into a single macro-operation. Some examples of this are shown in FIGS. 2 to 5.

Figure 2:
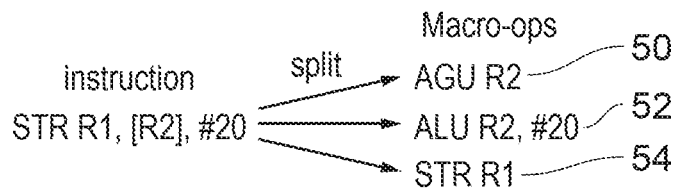
FIG. 2 shows an example of splitting a program instruction into multiple macro-operations.

FIG. 2 shows an example of splitting an instruction into multiple macro-operations. In a typical high-performance superscalar micro architecture, there are a reasonable number of program instructions which are split into smaller operations in order to implement the instruction's processing functionality. For example, there may be some instructions which require operations to be performed in several different execution units 22, 24, 26, 30, and so splitting these instructions into several macro-operations enables the different parts of the functionality to be performed more efficiently, firstly as this could allow the different parts to be implemented in parallel, but also because it means part of the functionality can proceed even if there is a delay in performing the other part, which can result in more efficient use of the processing resource available than if execute units for handling the entire instruction's functionality had to be available at the same time.

FIG. 2 shows an example where a store instruction uses post-indexed addressing, which means that the store is carried out using an address generated based on a base address stored in a register R2, with the base register R2 subsequently being updated by adding an offset value (an immediate value of 20 in this example) to the base address, so that a subsequent instance of executing the same instruction would access a different address as the base register would now have changed. Combining both the store operation itself and the address update into a single program instruction can help improve code density and reduce the amount of storage required in the instruction cache 6 and the fetch bandwidth associated with a given program. At the decode stage 12, such a store instruction can be split into multiple macro-operations, including a first macro-operation 50 to be handled by the address generation unit 26 for generating the target address of the store operation using the value in the base register R2, a second macro-operation 52 to be handled by the ALU 22 which adds the offset #20 to the value in base register R2 to generate the new base address which is stored back to the base register R2, and a third macro-operation 54 to be handled by the load/store unit 30 which carries out the store operation to store the data value in data register R1 to a location in the memory system identified by the address generated by the first macro-operation 50.

Another example of a program instruction which can be split into multiple macro-operations is a load multiple instruction, or store multiple instruction, which specifies a list of two or more separate target registers 16 and triggers separate load/store operations each transferring data between a respective one of the registers and the memory system. The decode stage 12 may split such a load/store multiple instruction into separate load/store macro-operations, each macro-operations specifying a single target register and controlling the pipeline to perform the load/store operation for that particular target register.

Figure 3:
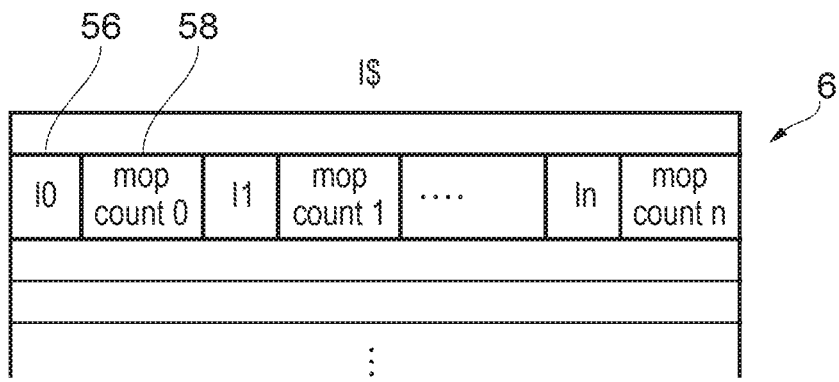
FIG. 3 shows an example of storing predecode information specifying a macro-operation count value in an instruction cache.

Hence, the predecode stage 40 may examine the encodings of each instruction in a block of instructions fetched from the data store 4 and identify whether any of those instructions should be split into multiple macro-operations. As shown in FIG. 3, each instruction 56 in the block can be stored in the instruction cache 6 in association with a corresponding macro-operation count value 58 which is indicative of a number of macro-operations to be generated by the decoding circuitry for that program instruction. Hence, when the instructions are fetched by the fetch stage 10, the predecode information including the macro-operation count value 58 is provided to the decode stage 12, which then decomposes the instruction into the specified number of macro-operations. This has several benefits. Firstly, the macro-op count identifying operation is performed once when instruction data is loaded into the instruction cache 6, which enables power savings in comparison with doing it every time the instruction is decoded later in the pipeline. Also, this approach can provide improved timing in the decode stage 12 due to the reduction in the logic cone size.

In some examples the macro-operation count value 58 may specify the exact number of macro-operations to be generated for each instruction. However, while there may be an occasional instruction which maps to a large number of macro-operations (e.g. a load multiple instruction which specifies 10 different target registers, say), in practice most instructions map to relatively few macro-operations, with instructions mapping to 1 or 2 macro-operations being most common. There is an energy cost in storing the macro-operation counts 58 for each instruction stored in the instruction cache 6. As few instructions will require the maximum possible value, providing enough bits of cache storage for representing every possible value of the macro-operation count 58 may require too many bits, which would consume more power and circuit area and may outweigh the benefits achieved by simplifying the decode stage 12.

Hence, the inventors recognised that for a better balance between performance and power consumption, another approach can be for the macro-operation count value 58 to specify the actual number of macro-operations to be generated in the case when the number of macro-operations is less than a given threshold number, but when the number of macro-operations identified for a particular instruction is greater than or equal to the threshold then the macro-operation count value can simply specify a predetermined value which indicates that the number of macro-operations to be generated is the threshold number or more. In the cases when the macro-operation count value specifies the number of macro-operations less than the threshold then there is no need for any further decoding of the number of macro-operations by the decode stage 12, and this may be the case for a majority of instructions.

However, on the few occasions when a greater number of macro-operations is required, then the decoding circuitry may perform some additional decoding to determine the actual exact number of macro-operations required. This additional decoding step would be triggered when it is detected that the macro-operation count value 58 for a given instruction specifies the predetermined value. Nevertheless, with this approach, the logic steps in the decode stage 12 can be reduced while maintaining more efficient use of storage capacity of the instruction cache.

The threshold level for capping the count value 58 can be arbitrarily selected depending on the energy/performance trade required for a given system. For example, if the threshold level is 3 or 4, then the macro-operation counts could be specified using a 2-bit field (if the threshold level is 3, one 2-bit encoding of the bit field would be spare for indicating other predecode information).

Figure 4:
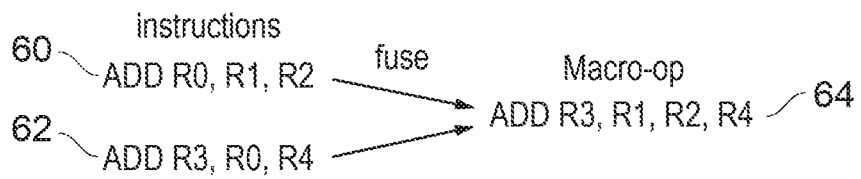
FIG. 4 schematically illustrates an example of fusing multiple instructions into a fused macro-operation.

FIG. 4 shows an example of fusing multiple instructions into a single macro-operation. As shown in the right hand part of FIG. 4, the ALU 22 and the execute stage 20 may in some cases support a three-input add operation where a destination register R3 is set to the sum of three different source operands R1, R2, R4 (R3=R1+R2+R4).

However, while the micro-architecture of one particular pipeline may support such a three-input addition, the instruction set architecture may also support other micro-architectures which do not have a three-input add operation supported in hardware. Therefore, the program instructions fetched from memory may be written using two-input add operations, where a destination register is set to the sum of two source operands read from registers.

In this case, when a programmer or compiler requires three values to be added together, they may implement this using two separate two-input add instructions, a first to generate R0=R1+R2 and a second to generate R3=R0+R4, which when executed in sequence give the same result as the operation R3=R1+R2+R4 shown above. Simpler micro-architectures which only support the two-input add can simply execute the program instructions in their original form as corresponding macro-operations. However, a more complex micro-architecture which supports three-input adds may detect that the destination register R0 of the first add instruction 60 is the same as one of the source registers of the second add instruction 62, and in this case may fuse them together to generate a single three-input add macro-operation 64 which is passed to remaining stages of the pipeline.

Other examples of instructions which can be fused together may include cryptographic instructions. Some cryptographic algorithms (e.g. AES or SHA) may include a series of dependent operations, and separate program instructions may be specified by an instruction set architecture for controlling different steps of the algorithm. However, often the entire algorithm may need to be performed. Hence, it may be reasonably likely that when one cryptographic instruction is encountered in the program code, another will follow soon after. Therefore, some micro-architectural implementations may provide an execute stage 20 with an execute unit supporting execution of a single fused operation which corresponds to several of the cryptographic instructions combined, and so fusing these cryptographic instructions into a single macro-operation can be performed by the decode stage 12.

Of course, other types of instructions could also be fused, depending on the execute units provided in the execute stage 20. In general, an advantage of fusing multiple instructions into a single fused macro-operation can be to increase bandwidth in subsequent stages of the pipeline such as the rename stage 14 or the issue stage 18. By reducing the number of entries required to be occupied for the operations corresponding to a given set of program instructions fetched from the cache 6, this can free up entries in the rename stage 14 or issue stage 18 for use in handling other operations, which can allow those other operations to be performed faster, and hence improve performance.

However, a significant amount of decoding logic may be required to detect whether groups of two or more instructions can be fused. For example, this logic may need not only to examine the opcodes of the respective instructions, but may also need to check other parameters such as the registers specified by those instructions to check whether they are dependent on each other (e.g. the fusion shown in the example of FIG. 4 may be possible when the second add specifies a source register which is the same as a destination register of the first add, but not if the two adds are independent).

The logic for determining whether at least some types of instructions can be fused can be provided within the predecoding circuitry 40, so that when a block of instructions is fetched into instruction cache 6, it is examined by the predecode logic 40 which checks respective groups of two or more instructions within the block to check whether they can be fused. An instruction fusion indicator 66 can then be stored with respective instructions in the instruction cache 6 to indicate whether groups of two or more instructions are able to be fused into a single fuse macro-operation. The decode stage 12 can then read the fusion indicator associated with fetched instructions, and use the fusion indicator to determine which macro-operations to generate. In some cases the predecoding circuitry 40 may restrict its examination of whether to fuse instructions to adjacent instructions, and in this case the instruction fusion indicator 66 for a given instruction may specify whether that instruction can be fused with the next instruction. Other implementations may also examine non-adjacent instructions so that instructions can be fused even if they are separated by one or more intervening instructions. In this case the instruction fusion indicator 66 may include other information such as identifying the other instruction with which a particular instruction can be fused. It is not necessary for the predecode circuitry 40 to identify every possible group of instructions which could be fused. For example, in some cases only some types of instructions may have their fusion identified at the predecode stage 40, while other types of instructions may still be subject to fusion detection at the decode stage 12.

Detecting whether instructions can be fused at the predecode stage 40 has a number of advantages. In addition to the power savings achieved by performing the fusion detection only once when loading data into the cache rather than every time the instruction is decoded, there is also an additional benefit in that the predecode stage 40 may be more likely to be able identify a set of fusible instructions than the decode stage 12. The decode stage 12 typically examines a smaller block of instructions at a time than the block of instructions prefetched into the instructions cache 6 in a single unit. Also, there can be bubbles in the decode pipeline, where some decode slots are not filled with fetched instructions. This means it is more likely that two instructions which could have been fused are split between different decode blocks considered by the decode stage 12 in separate cycles. If the decode stage does not encounter both of the instructions at the same time, it may not be able to detect that there are instructions available to be fused. On the other hand, by performing instruction fusion detection at the predecode stage 40, as a cache line fetched from the data store 4 is typically much larger than the decode block size, instruction fusion is possible more frequently, resulting in more performance improvement at later stages of the pipeline due to the reduced rename/issue bandwidth taken up by the fused instruction.

Figure 6:
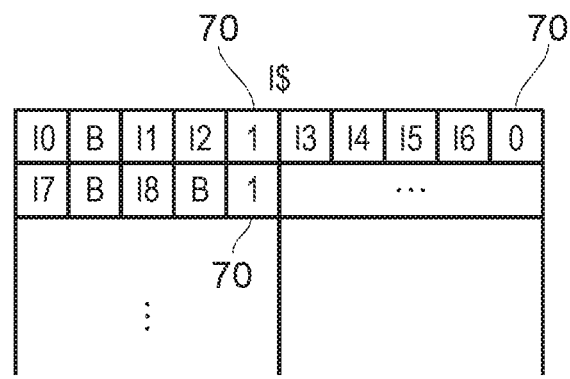
FIG. 6 shows an example of predecode information indicating whether a subset of program instructions comprises at least one branch instruction.

FIG. 6 shows another example where the predecode stage 40 performs branch instruction detection. When a block (cache line) of program instructions is fetched into the instruction cache 6, for each subset of program instructions within the block, the predecode stage 40 may detect whether any of those instructions is a branch instruction, and may set a branch instruction indicator 70 as part of the predecode information, which indicates whether any of the instructions in the corresponding subset of the cache line is a branch. The subset of the cache line can in some cases be the whole cache line, but in many cases may be a proper subset of the cache line (i.e. the subset is smaller than the entire cache line). It can be useful for the subset of the cache line to correspond in size with the size of the block of instructions fetched from the cache 6 in one block by the fetch stage 10, and often this may be smaller than one cache line.

Figure 7:
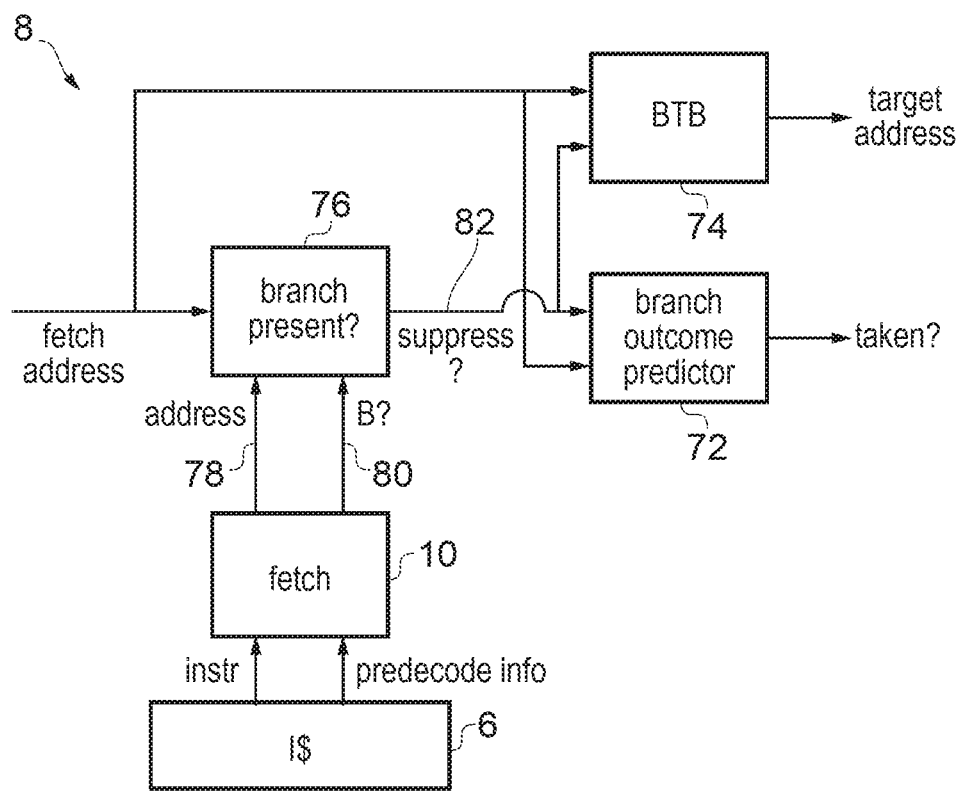
FIG. 7 shows an example of branch prediction circuitry suppressing at least one branch prediction action for a subset of program instruction identified as comprising zero branches.

As shown in FIG. 7, the branch predictor 8 provided to predict the outcomes of branch instructions can then suppress at least one branch prediction action for a subset of program instructions identified by the predecode information as comprising zero branch instructions. For example the branch predictor may have a number of branch prediction resources for predicting different aspects of the outcomes of branch instructions. For example, in the case shown in FIG. 7 the branch predictor 8 may include a branch outcome predictor 72 for predicting whether a branch instruction is taken or not taken, and a branch target buffer (BTB) 74 (also known as a branch target address cache (BTAC)) for predicting the target address to which program flow is redirected in the event that a branch is predicted taken. There may be a certain energy cost in looking up the branch outcome predictor 72 and BTB 74, since SRAM-based storage circuitry may need to be looked up for the fetch address of a block of instructions to be fetched in order to identify the branch outcome and predicted target address. For example the branch outcome predictor 72 or the BTB 74 may have a cache-like structure and looking up the cache may require comparison or portions of a fetch address against tags stored in each entry of a given set of locations within the predictors 72, 74. This tag comparison operation can consume power.

However, in practice a relatively significant proportion of fetch blocks of instructions do not contain any branches, and in this case the power consumed in looking up the BTB or branch outcome predictor 72 may be wasted. To enable dynamic power savings, the branch predictor 8 may have some additional logic 76 for determining whether a branch is actually present in the block of instructions to be fetched and may suppress at least part of the operations performed by the branch outcome predictor 72, BTB 74 or another branch prediction resource if no branches are predicted to be present.

Hence, a branch presence detector 76 may detect whether branches are present based on the predecode information generated by the predecode stage 40. When the fetch stage 10 fetches a group of instructions from the cache 6, it may check the predecode information and forward the address 78 and branch presence indicator 80 for that block of instructions to the branch presence logic 76 which may maintain a storage structure which caches the branch presence indicators for a number of recently encountered fetch addresses. When a fetch address is input to the branch predictor 8 then this may be looked up in the branch presence storage structure and the branch presence logic 76 may then determine whether there is at least one branch in the corresponding block of instructions. If there are no branches in the current block, a signal 82 is issued to one or more branch prediction resources (e.g. the BTB 74 or branch outcome predictor 72) suppressing at least one prediction action.

In some cases the entire lookup of the BTB 74 or branch outcome predictor 72 may be suppressed. In other cases, to improve performance the lookup of the BTB 74 or the branch outcome predictor 72 based on the fetch address could be triggered in parallel with the checking of the branch presence structure 76, but then if it is determined that there are no branches present in the current fetch block, subsequent parts of the branch target prediction or branch taken prediction can be suppressed. For example, even if the initial lookup of the BTB has already started, if the branch presence logic 76 signals that there are no branches then subsequent steps for qualifying the result of the BTB lookup could be suppressed to save power. In this case, even if the lookup of the storage structure has already started, there can still be power savings in suppressing later steps and also performance benefits since if the block of instructions corresponding to the current fetch address is determined to have no branches then the next fetch cycle can be initiated from an address following sequentially from the current fetch address without waiting for the outcome of the full prediction operations performed by the BTB 74 or branch outcome predictor 72. While FIG. 7 shows an example where the fetch stage 10 provides the branch presence indicator to the branch predictor 8, in other cases the decode stage 12 could forward the branch presence indicator 80, but based on information set by the predecode stage 40 when prefetching instructions into the cache 6.

In another example the predecoding operation may comprise generating predecode information which is indicative of whether a program instruction specifies a same register as both the source register and a destination register. The decode stage 12 can be responsive to this information to determine whether a previous value for the destination register is to be specified as an operand for a given macro-operation to be generated for the rest of the pipeline in response to that program instruction. An example of this is shown in FIGS. 8 and 9. As shown in FIG. 8, some types of instructions may be executed conditionally, which means that whether or not the destination register of the instruction is set to the result of the corresponding processing operation depends on whether some condition is met (often dependent on a comparison between two data values or a result of a preceding instruction). Hence, one would generally expect that if the condition is failed for a given conditional instruction, then the destination register of the instruction should retain the previous value that was stored in the register before the instruction was executed.

However, in a system supporting register renaming, an architectural register servicing as a destination register of a given instruction or macro-operation is remapped to a given physical register, which is often not the same physical register as the physical register storing the previous data value representing the architectural state of that destination register. Therefore, even if the condition associated with the instruction is failed, there may still need to be an operation performed to transfer the previous value associated with the destination architectural register from the old physical register to the new physical register now being mapped to that architectural register. To enable such move operations to be performed, the decode stage 12 may include an additional source operand for the corresponding macro-operation, representing the previous value of the destination register, in addition to the reference to the destination register itself. This is illustrated in the top example of FIG. 8 where the old version of the destination register (indicated as "(R0)") is included alongside the destination register reference R0.

When the macro-operation reaches the rename stage 14, the rename stage remaps the old destination register reference (R0) to whichever physical register Rx is currently mapped to architectural register R0 (this can be read from the rename table). The other source registers of the macro-operation are similarly remapped from architectural registers to physical registers. Also, the rename stage 14 selects a new physical register Ry not currently allocated to an architectural register, updates the rename table to indicate that the architectural register R0 is now remapped to the new physical register Ry, and passes the macro-operation to the issue stage 18 specifying physical register Ry as the destination register and physical register Rx as one of the source operands. When executed, the macro-operation controls the execute stage 20 to write either the result of the processing operation itself, or the previous value specified as the additional operand, to the destination physical register Rx, depending on whether the condition passes or fails.

In some cases the macro-operation may be split at the issue stage 18 or execute stage 20 into several micro-operations at the issue stage 18 to implement this selection, e.g. a first micro-operation (conditional on the condition being passed) which calculates the result of the processing operation to be performed, and a second micro-operation (conditional on the condition being failed) which moves the previous value of the destination register from the old physical register Rx to the new physical register Ry. One or other of the first and second micro-operations will then be cancelled depending on the condition outcome and the other can be executed to update the new physical register Ry with the appropriate result.

Alternatively, such splitting of the operation into a conditional processing operation and a conditional move operation may be done at the decode stage 12, so that the original conditional instruction is mapped to two separate macro-operations. In this case, a conditional instruction may be another example of an instruction for which the technique of FIGS. 2 and 3 can be used, where the predecode stage 40 may generate an indication of how many macro-operations are to be generated.

Regardless of which of these approaches is taken, in general conditional instructions may require an additional source operand to be specified, to take account of the previous value of the destination architectural register. However, including an additional source operand requires additional power in terms of the rename table read, and slot storage at the issue stage 18 and the execute stage 20 in processing the operation. Including an additional operand can also reduce dispatch bandwidth as some execution units may allow fewer source operands compared to others. That is, in some implementations, the execute stage 20 could have one execute unit which supports operations using a larger number of operands and another execute unit which only supports operations with fewer operands. Hence, if the additional operand corresponding to the old value of the destination register is included, this may restrict the choice of execution unit, which can sometimes reduce performance if the operation has to wait for that execution unit to become available when it otherwise could have used a different execution unit.

As shown in the lower example of FIG. 8, sometimes the destination register of a conditional register may be the same as one of the source registers. For example in this example the register R0 is used as both a source register and a destination register. In this case, it is not necessary to include an additional source operand corresponding to the old version of the destination register, because this is already included as one of the source operands. Hence, if it is detected that the same register is used as both a source register and a destination register for a conditional instruction, the decode stage 12 can issue the macro-operation with fewer operands. This can enable power savings downstream because of the reduced bandwidth in subsequent stages, and improve performance because the flexibility to use a less complex execute unit for this operation can allow the instruction to be processed earlier or avoid a more complex execute unit being blocked so that it cannot be used for other instructions.

The predecode stage 40 may compare source and destination register references for conditional instructions and detect whether the destination register of a given conditional instruction is the same as any of its source registers. The predecode stage 40 generates a predecode indicator 90 specifying whether the destination register is detected to be the same as one of the source registers, and stores it as sideband information along with the corresponding instruction (for unconditional instructions the indicator 90 may have the same value as for conditional instructions where the destination register is different to all of the source registers). Alongside the indicator 90, the predecode information may also include an indication of which of the source operands matched the destination register which can be used. When instructions are fetched and decoded, the decode stage 12 may determine from the predecode indicator 90 whether to include the previous value of the destination register as an additional source operand. Also, the information indicating which source operand matched the destination register can be used by the decode stage 12 to generate information for controlling subsequent stages to write the corresponding source operand value to the destination register in the case when the condition fails. By generating this information at the predecode stage rather than the predecode stage 12, the operation only has to be performed once when the instruction is loaded into the cache 6, rather than being incurred multiple times each time the same cache instruction is decoded.

Figure 11:
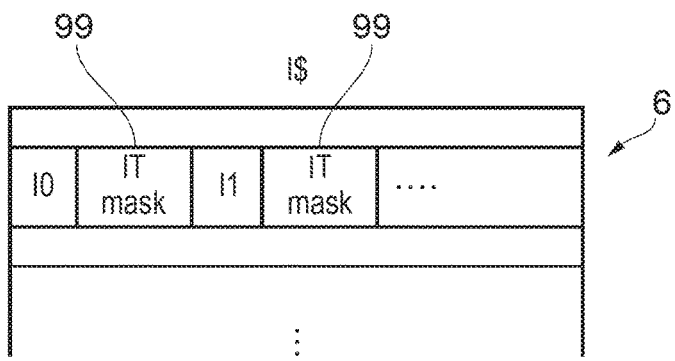
FIG. 11 illustrates an example where the predecode information in the instruction cache specifies the control field for controlling the conditional processing of an instruction.

FIGS. 10 and 11 show another example where the predecode stage 40 can be used to generate predecode information which includes a control field 99 which specifies, for a given program instruction, information for controlling conditional processing of macro-operations corresponding to that program instruction and zero, one or more subsequent instructions. As mentioned above, some instructions may be conditional. In some instruction set architectures, a conditional instruction may specify its predicating condition as part of its instruction encoding. However, this requires some bits of the instruction encoding to be used for specifying the condition, which may reduce the amount of encoding space available for other information (which limits what other functionality can be provided within the instruction set), or require a longer instruction encoding to be used (which would increase power consumption in processors implementing such an instruction set, due to the wider datapaths required for carrying each instruction and the increased cache and memory storage capacity required for the programs written using the instruction set). Therefore, often encoding space is at a premium, and it can be desirable to make more efficient use of a given number of instruction encoding bits.

Therefore, some architectures may support at least some instructions which do not have space in the instruction encoding for an explicit condition. Nevertheless, it may still be desirable to allow those instructions to execute conditionally. Therefore, some architectures may provide a predicating instruction 102 which can be executed prior to an instruction to make it conditional. The predicating instruction 102 sets up the condition to be used for a variable number of subsequent instructions. An example of a predicating instruction 102 is the "IT" (if-then) instruction provided in the Thumb® instruction set and subsequent instruction set architectures by ARM® Limited of Cambridge, UK. As shown in FIG. 10, the IT instruction 102 specifies a predicating condition (cond) and a mask value.

The mask value has 4 bits whose encoding identifies (a) how many subsequent instructions are to be executed in dependence on the condition, and (b) how the condition should be used by each of those subsequent instructions (whether the instructions should write their result when the specified condition is satisfied, or when an opposite condition is satisfied). Up to 4 subsequent instructions may be predicated based on the condition specified by the IT instruction 102. The mask value specified by the IT instruction 102 is used to derive corresponding mask values for each of the subsequent instructions, to provide a mechanism by which information set by the IT instruction 102 can be passed down to subsequent instructions to control their conditional execution without needing to be stored in the architectural register file. For the first instruction I0 following the IT instruction, the mask value specified by the IT instruction is simply copied without change, to generate the mask 99-0 for instruction I0. The first instruction I0 following the IT instruction is always a "then" (T) instruction, for which the result will be written to the destination register if the condition specified by the IT instruction 102 is satisfied.

On the other hand, the next 3 instructions may be either another T instruction, an "else" (E) instruction for which the result is written to the destination register when an opposite condition to the condition specified by the IT instruction 102 is satisfied (the opposite condition being a condition which is satisfied when the originally specified condition is not satisfied), or may be unconditional if fewer than 4 instructions are indicated by the IT instruction as being conditional. For example, if the condition specified by the IT instruction is an "equal" condition (EQ), the opposite condition would be a "not equal" (NE) condition, and so a subsequent E instruction may write its result to the destination register if the values being compared are not equal. To implement this, for each subsequent instruction, the mask field 99 of the preceding instruction is left shifted by one bit position to generate the mask for the next instruction. In FIG. 10, for example, left-shifting mask 0101 for I0 gives the new mask 1010 for instruction I1. When the left shift causes a bit value of 0 to be shifted out of the mask, this means that the following instruction is treated as a T instruction. When a bit value of 1 is shifted out of the mask, the following instruction is treated as an E instruction. When the last "1" bit is shifted out of the mask, the mask becomes 0000, and the corresponding instruction is executed unconditionally. Hence, the size of the IT block (the instructions which are to be executed conditionally) will depend on the position of the least significant "1" bit in the original mask specified by the IT instruction I02. For example, a mask of 0100 or 1100 would result in two subsequent instructions being executed conditionally, since two left shifts is enough to cause all the '1' bits to disappear from the mask. The bits that are more significant than the lowest "1" bit in the mask encode whether the subsequent conditional instructions are to be treated as T or E instructions.

More information on the IT instruction, its encoding and how to implement its processing can be found in the published UK patent application GB2402510. It will be appreciated that this is just one example of a predicating instruction, and others may use a different encoding of the mask to control how the subsequent instructions are executed conditionally. For this type of instruction, decoding the predicating instruction and its conditional instructions can be relatively complicated as the mask information 99 is passed from instruction to instruction. This can be particularly challenging on superscalar processors where multiple instructions may be decoded in parallel, but generating the mask field 99 for one instruction may depend on what previous instructions are provided. For example, if the decode stage 12 can decode four instructions in parallel, the instructions corresponding to a given IT block may be split across separate decoding windows so that some of the instructions of the IT block are decoded in one cycle and other instructions are decoded in the next cycle, and in this case retaining the mask information from one cycle to the next can increase the complexity of the decode logic.

Instead, as shown in FIG. 11, the mask fields (or any other type of control information used to control conditional execution, where the control field for one instruction may depend on the control field for an earlier instruction) can be generated at the predecode stage 40. The predecode stage 40 may detect the predicating instruction 102 and use it to generate the mask 99 to be used for the subsequent instructions. As shown in FIG. 11 the IT mask for each instruction can then be stored as predecode information 99 in the instruction cache 6. This avoids the need to generate the masks at the decode stage 12 when subsequently decoding the instructions are fetching them from the cache 6. As well as providing power savings, because the mask generating operation is performed only once when loading instruction data into the instruction cache 6 rather than multiple times each time the same instruction is decoded at the decode stage 12, detecting the masks 99 at the predecode stage also can reduce the complexity of the logic for generating the masks, because it is more likely that all the instructions of an IT block will be present in one cache line than one decode window, as the cache line is typically larger than the size of a decode window considered by the decode stage 12.

Figure 12:
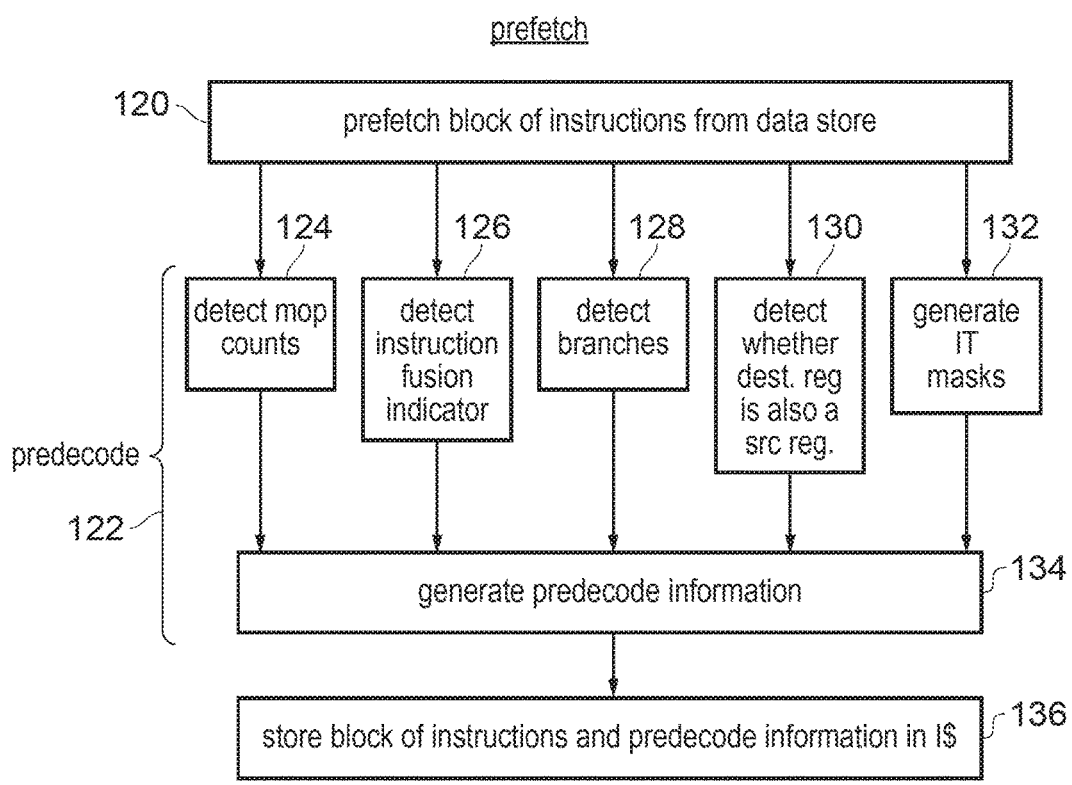
FIG. 12 is a flow diagram showing predecoding operations.

FIG. 12 is a flow diagram showing a method of predecoding instructions at the predecode stage 40. At step 120 the predecode stage 40 prefetches a block of instructions from the data store 4. The prefetch event can be triggered by a number of conditions. For example, the system may have a prefetch predictor which predicts which instructions are likely to be needed in the instruction cache 6 in future, before they are actually required by the fetch stage 10. Any known instruction prefetching mechanism can be used for this, for example a next line predictor which keeps prefetching cache lines with sequential addresses until reset when the fetch stage signals that a cache line not present in the cache is required. Alternatively, some instructions prefetchers may predict more complex instruction access patterns based on past history. On other occasions, if there has been a branch misprediction or other unexpected event, then the prefetcher may be directed by the fetch stage 10 to prefetch a different block of addresses.

Figure 5:
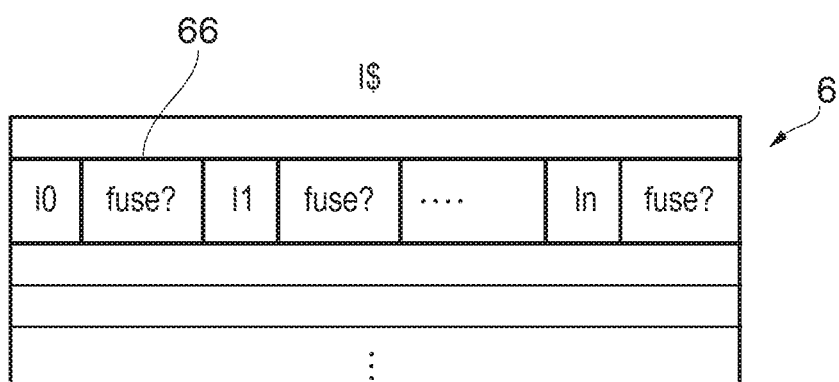
FIG. 5 shows an example where the predecode information specifies an instruction fusion indicator.

The predecode stage 40 performs a predecoding operation on the prefetched block of instructions at step 122. The predecoding operation 122 may include a number of operations, including any one or more of the following:

detecting the micro-operation counts at step 124 as discussed for FIGS. 2-3 or detecting the instruction fusion indicator at step 126 as discussed for FIGS. 4-5, to determine how many macro-operations to generate for a given block of one or more instructions, detecting the presence of branch instructions at step 128, as discussed for FIGS. 6-7;

detecting whether the destination register is also a source register at step 130, as shown in FIGS. 8-9; and generating the conditional control fields (IT masks) at step 132, as shown in FIGS. 10-11.

Not all implementations need to do all of these predecoding operations 124-132. In general any combination of one or more of these predecoding steps may be implemented in a given system (e.g. with others left to the decode stage 12 or not being required at all for a certain micro-architecture).

At step 134 the predecode stage generates predecode information to be stored in the instruction cache 6 with each cache line, based on the outcomes of the various predecode steps of the predecode operation 122. Some types of predecode information may be associated with particular instructions and stored in the cache in association with those instructions. For example the IT masks or the macro operation counts may be stored for particular instructions. Other types of predecode information may apply to the cache line as a whole or to a subset of the cache line, such as the branch presence indicator generated at step 128.

In some implementations the predecode information may include a number of separate fields which separately specify the different types of predecoding information. For example, the macro operation count may be encoded separately from the IT mask and the branch presence indicator. However, in other implementations a unified encoding of predecode information may combine several different pieces of information into a single value. For example, a given bit field may have some bits combinations which represent macro operation counts, but for other instructions other encodings of the same bit field may be used to indicate other information such as the IT mask or other information (e.g. information specifying whether an instruction is undefined). Hence, while the predecode information may be indicative of a range of different pieces of information, it is not essential for each of those pieces of information to be separately encoded. It is enough that the predecode information as a whole has a value such that the decode stage 12 can determine the separate pieces of information at a later stage if necessary. At step 136 the prefetched block of instructions is stored along with its predecode information in the instruction cache 6.

Figure 13:
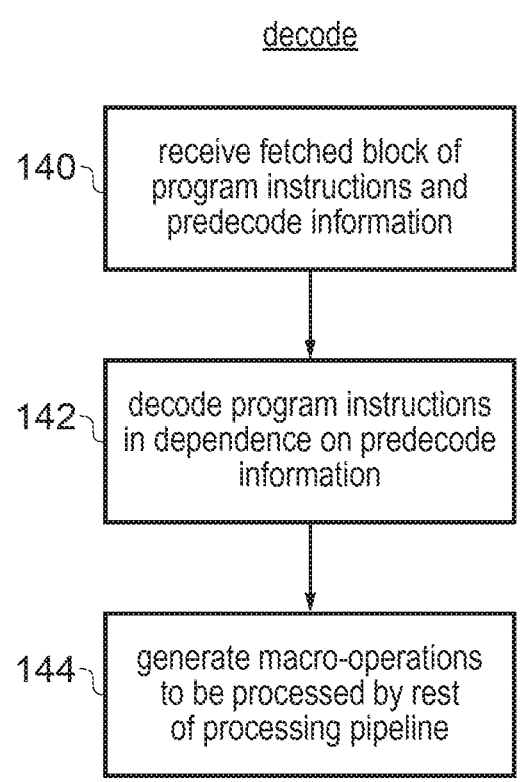
FIG. 13 shows a method of decoding instructions.

FIG. 13 shows a method performed at the decode stage. At step 140 a fetched block of program instructions is received from the fetch stage 10 along with predecode information which was fetched from the instruction cache 6 along with the instructions. Note that the block of program instructions fetched at step 140 may often be smaller than the block of instructions prefetched at step 120. At step 142, the decode stage 12 decodes the block of program instructions in dependence on the predecode information. As certain information required by the decode stage have already been determined by the predecode stage 40, the decode stage 12 can determine these more efficiently than if it had to derive all this information from the instruction encoding itself. This simplifies the decode logic, saving power and improving performance. At step 144 the decode stage generates macro-operations to be processed by the remaining stages of the pipeline, using the information derived from the predecode information at step 142.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
   processing circuitry;
   an instruction cache;
   decoding circuitry to decode program instructions fetched from the instruction cache to generate macro-operations representing decoded operations to be processed by the processing circuitry; and
   predecoding circuitry to perform a predecoding operation on a block of program instructions fetched from a data store, the predecoding operation performed before the block of program instructions is read from the instruction cache for decoding by the decoding circuitry, to generate predecode information to be stored to the instruction cache for said block of program instructions;
   wherein the predecoding operation comprises generating predecode information indicative of how many macro-operations are to be generated by the decoding circuitry in response to a group of one or more program instructions within said block of program instructions fetched from the data store.

2. The apparatus according to claim 1, wherein the decoding circuitry is configured to determine how many macro-operations are to be generated in response to said group of one or more program instructions in dependence on the predecode information generated by the predecoding circuitry.

3. The apparatus according to claim 1, wherein the decoding circuitry is configured to map a single program instruction fetched from the instruction cache to a plurality of macro-operations to be processed by the processing circuitry, in dependence on the predecode information generated by the predecoding circuitry.

4. The apparatus according to claim 3, wherein the predecode information comprises a macro-operation count value indicative of a number of macro-operations to be generated by the decoding circuitry for a given program instruction.

5. The apparatus according to claim 4, wherein when said number of macro-operations is less than a threshold number, the predecoding circuitry is configured to generate the macro-operation count value specifying said number of macro-operations; and
   when said number of macro-operations is greater than or equal to said threshold number, the predecoding circuitry is configured to generate the macro-operation count value specifying a predetermined value.

6. The apparatus according to claim 5, wherein the decoding circuitry is configured to determine the number of macro-operations to be generated in response to an instruction for which said macro-operation count value specifies said predetermined value.

7. The apparatus according to claim 1, wherein the decoding circuitry is configured to map a plurality of program instructions fetched from the instruction cache to a single fused macro-operation to be processed by the processing circuitry, in dependence on the predecode information generated by the predecoding circuitry.

8. The apparatus according to claim 7, wherein the predecode information comprises an instruction fusion indicator indicative of whether a group of two or more program instructions in said block of program instructions are able to be fused into a single fused macro-operation.

9. The apparatus according to claim 1, wherein the predecoding operation comprises generating predecode information indicative of whether a subset of program instructions within said block of instructions comprises at least one branch instruction.

10. The apparatus according to claim 9, comprising branch prediction circuitry to predict outcomes of branch instructions;
   wherein the branch prediction circuitry is configured to suppress at least one branch prediction action for a subset of program instructions identified by the predecode information as comprising zero branch instructions.

11. The apparatus according to claim 1, wherein the predecoding operation comprises generating predecode information indicative of whether a program instruction specifies a same register as both a source register and a destination register.

12. The apparatus according to claim 11, wherein the decoding circuitry is configured to determine whether a previous value of the destination register is to be specified as an operand for a given macro-operation in dependence on the predecode information.

13. The apparatus according to claim 1, wherein the predecoding operation comprises generating predecode information comprising a control field specifying, for a given program instruction, information for controlling conditional processing of macro-operations corresponding to said given program instruction and zero, one or more subsequent program instructions by said processing circuitry.

14. The apparatus according to claim 13, wherein the predecoding circuitry is configured to generate said control field for said given program instruction in dependence on the control field specified for at least one preceding program instruction of said block of program instructions.

15. The apparatus according to claim 13, wherein said control field for said given program instruction is indicative of how many subsequent program instructions are dependent on the control field for said given program instruction.

16. A data processing method comprising:
   fetching a block of program instructions from a data store;
   performing a predecoding operation on the block of program instructions to generate predecode information;
   storing the block of program instructions and the predecode information in the instruction cache; and
   decoding program instructions fetched from the instruction cache to generate macro-operations representing decoded operations to be processed by processing circuitry;
   wherein the predecoding operation is performed on the block of program instructions before the block of program instructions is read from the instruction cache for decoding; and
   wherein the predecoding operation comprises generating predecode information indicative of how many macro-operations are to be generated by the decoding circuitry in response to a group of one or more program instructions within said block of program instructions fetched from the data store.

17. An apparatus comprising:
   an instruction cache;
   decoding circuitry to decode program instructions fetched from the instruction cache;
   processing circuitry to perform data processing in dependence on the decoded program instructions; and
   predecoding circuitry to perform a predecoding operation on a block of program instructions prefetched from a data store, the predecoding operation performed before the block of program instructions is read from the instruction cache for decoding by the decoding circuitry, to generate predecode information to be stored to the instruction cache for said block of program instructions;
   wherein the predecoding operation comprises generating predecode information indicative of whether a subset of program instructions within said block of instructions comprises at least one branch instruction.

18. The apparatus according to claim 17, comprising branch prediction circuitry to predict outcomes of branch instructions;
   wherein the branch prediction circuitry is configured to suppress at least one branch prediction action for a subset of program instructions identified by the predecode information as comprising zero branch instructions.

* * * * *